Patented May 22, 1934

1,960,134

UNITED STATES PATENT OFFICE 1,960,134

PROCESS FOR THE ISOLATION OF PIPERITONE

John William Blagden, Loughton, and Walter Edward Huggett, Romford, England, assignors of one-third to Howards & Sons Limited No Drawing. Application December 19, 1933, Serial No. 703,152. In Great Britain October 25, 1932

12 Claims. (Cl. 260—132)

This invention relates to an improved process for isolating piperitone from essential oils containing it. The process is economical and permits a substantially quantitative recovery of the piperitone. It is based on the discovery that piperitone forms with ortho-phosphoric acid a compound which appears to be of a nature similar to that of the phosphoric acid addition compounds of terpene and hydro-aromatic alcohols described in U. S. Patent No. 1,932,130 and application No. 635,704.

The process of the invention comprises the conversion of the piperitone in the essential oil from which it is to be isolated into a reaction product with ortho-phosphoric acid and the liberation of the piperitone from this reaction product after separation from the other ingredients of the oil.

Piperitone forms with ortho-phosphoric acid a reaction product which contains one molecule of piperitone for each molecule of phosphoric acid. The product is sparingly soluble or insoluble in the terpene constituents of essential oils and in some organic solvents, but is readily soluble in ortho-phosphoric acid. Hence a convenient procedure consists in treating the essential oil containing the piperitone, such as the oil Eucalyptus dives, with ortho-phosphoric acid in the proportion required for the formation of the phosphoric acid compound of piperitone or in excess of this proportion, in presence or absence of a solvent, such as a liquid hydrocarbon. Depending upon the quantity of phosphoric acid used, there separates from the reaction mixture either the phosphoric acid compound of piperitone or a solution of this compound in phosphoric acid. The use of an excess of phosphoric acid may facilitate separation of the reaction mixture into layers, and is to be preferred; moreover, if an excess be not used, it may be necessary to repeat the treatment in order to isolate the whole of the piperitone. The phosphoric acid compound, or its solution in phosphoric acid, is removed and decomposed by means of water to produce piperitone and a diluted phosphoric acid which may be concentrated for re-use.

By suitably conducting the process, it becomes possible to isolate piperitone in its optically active form. For this purpose, the process should be conducted at a low temperature, say between 0° and 10° C., and the period during which the piperitone is in contact and in combination with the phosphoric acid should be maintained as short as is practicable. Also an excess of phosphoric acid should be used; otherwise the layer representing the phosphoric acid compound may retain further portions of the oil (for instance, phellandrene in the case of Eucalyptus dives) unless the separation into layers is assisted by heat, which, however, promotes racemisation of the piperitone.

The following examples illustrate the invention:—

1. 10 litres of Eucalyptus dives oil are cooled in ice water and 1.6 litres of phosphoric acid of 90 per cent. strength are added slowly, whilst continuously stirring and cooling so that the temperature does not exceed 10° C. After the mixture has been allowed to stand for a short while, it separates into two layers. The upper layer is removed and the lower layer, representing the phosphoric acid compound of piperitone, is heated to about 40-50° C., whereby a small quantity of phellandrene still contained in it separates as an upper layer. The lower layer is removed and mixed with water, whereby it is decomposed. There are obtained 3.2 litres of optically inactive piperitone, representing about 75 per cent. of that present in the original oil. The remainder can be obtained by again treating the original upper layer with phosphoric acid in like manner.

2. 25 litres of Eucalyptus dives oil are treated with 6 litres of phosphoric acid of 90 per cent. strength in the manner described in Example 1, whilst maintaining the temperature below 10° C. The lower layer is separated, washed with 20 litres of petroleum ether whilst maintaining the temperature below 10° C. and then decomposed with ice water. There is obtained a nearly quantitative yield of piperitone having an optical rotation of about $[\alpha]_D = -50°$.

It is to be noted that some essential oils containing piperitone, for instance, some varieties of Eucalyptus dives, have been reported to contain cineol. Cineol, as is known, also forms with phosphoric acid a compound decomposable by water, so that if cineol should be present in the parent oil it would be found in the piperitone isolated by the process of the invention. Should the piperitone be found to contain cineol in any appreciable quantity, it may easily be purified by distillation.

Having thus described the nature of the said invention and the best means we know of carrying the same into effect, we claim:—

1. A process for isolating piperitone from essential oils containing it, which comprises treating the oil with ortho-phosphoric acid and thereby converting the piperitone into a reaction compound with ortho-phosphoric acid, separating this compound from the remainder of the oil, decomposing the said compound into its constituents and recovering the liberated piperitone.

2. A process for isolating piperitone from essential oils containing it, which comprises treating the oil with ortho-phosphoric acid, allowing the reaction mixture to separate into layers, separating from the reaction mixture the layer comprising the compound of piperitone and ortho-phosphoric acid which has been formed, decomposing the said compound into its constituents and recovering the liberated piperitone.

3. A process for isolating piperitone from essential oils containing it, which comprises treating the oil with ortho-phosphoric acid in quantity exceeding one molecular proportion for each molecular proportion of piperitone present in the oil, allowing the reaction mixture to separate into layers, separating from the reaction mixture the layer comprising the compound of piperitone and ortho-phosphoric acid which has been formed, decomposing the said compound into its constituents and recovering the liberated piperitone.

4. A process for isolating piperitone from essential oils containing it, which comprises treating the oil in presence of an indifferent organic solvent with ortho-phosphoric acid, allowing the reaction mixture to separate into layers, separating from the reaction mixture the layer comprising the compound of piperitone and ortho-phosphoric acid which has been formed, decomposing the said compound into its constituents and recovering the liberated piperitone.

5. A process for isolating piperitone from essential oils containing it, which comprises treating the oil in presence of an indifferent organic solvent with ortho-phosphoric acid in quantity exceeding one molecular proportion for each molecular proportion of piperitone present in the oil, allowing the reaction mixture to separate into layers, separating from the reaction mixture the layer comprising the compound of piperitone and ortho-phosphoric acid which has been formed, decomposing the said compound into its constituents and recovering the liberated piperitone.

6. A process for isolating piperitone from essential oils containing it, which comprises treating the oil with ortho-phosphoric acid, allowing the reaction mixture to separate into layers, separating from the reaction mixture the layer comprising the compound of piperitone and ortho-phosphoric acid which has been formed, decomposing the said compound into its constituents, recovering the liberated piperitone and subjecting it to a distillation.

7. A process for isolating piperitone from essential oils containing it, which comprises treating the oil with ortho-phosphoric acid in quantity exceeding one molecular proportion for each molecular proporation of piperitone present in the oil, allowing the reaction mixture to separate into layers, separating from the reaction mixture the layer comprising the compound of piperitone and ortho-phosphoric acid which has been formed, decomposing the said compound into its constituents, recovering the liberated piperitone and subjecting it to a distillation.

8. A process for isolating optically active piperitone from essential oils containing it, which comprises treating the oil with ortho-phosphoric acid, allowing the reaction mixture to separate into layers, separating from the reaction mixture the layer comprising the compound of piperitone and ortho-phosphoric acid which has been formed, decomposing the said compound into its constituents and recovering the liberated piperitone, maintaining a temperature not substantially exceeding about 10° C. throughout the process and maintaining as short as is practicable the period during which the piperitone is in contact with and in combination with the ortho-phosphoric acid.

9. A process for isolating optically active piperitone from essential oils containing it, which comprises treating the oil with ortho-phosphoric acid in quantity exceeding one molecular proportion for each molecular proportion of piperitone present in the oil, allowing the reaction mixture to separate into layers, separating from the reaction mixture the layer comprising the compound of piperitone and ortho-phosphoric acid which has been formed, decomposing the said compound into its constituents and recovering the liberated piperitone, maintaining a temperature not substantially exceeding about 10° C. throughout the process and maintaining as short as is practicable the period during which the piperitone is in contact with and in combination with the ortho-phosphoric acid.

10. A process for isolating piperitone from the oil *Eucalyptus dives,* which comprises treating the oil with phosphoric acid in quantity exceeding one molecular proportion for each molecular proportion present in the oil, allowing the reaction mixture to separate into layers, separating the lower layer and treating it with water in order to cause separation of piperitone therefrom.

11. A process for isolating optically active piperitone from the oil *Eucalyptus dives,* which comprises treating the oil with ortho-phosphoric acid in quantity exceeding one molecular proportion for each molecular proportion of piperitone present in the oil, allowing the reaction mixture to separate into layers, separating from the reaction mixture the layer comprising the compound of piperitone and ortho-phosphoric acid which has been formed, decomposing the said compound into its constituents and recovering the liberated piperitone, maintaining a temperature not substantially exceeding about 10° C. throughout the process and maintaining as short as is practicable the period during which the piperitone is in contact with and in combination with the ortho-phosphoric acid.

12. A process for isolating piperitone from the oil *Eucalyptus dives,* which comprises treating the oil with phosphoric acid in quantity exceeding one molecular proportion for each molecular proportion present in the oil, allowing the reaction mixture to separate into layers, separating the lower layer and treating it with water in order to cause separation of piperitone therefrom, maintaining a temperature not substantially exceeding about 10° C. throughout the process and maintaining as short as is practicable the period during which the piperitone is in contact with and in combination with the ortho-phosphoric acid.

JOHN WILLIAM BLAGDEN.
WALTER EDWARD HUGGETT.